United States Patent [19]

Cohen et al.

[11] 4,235,376
[45] Nov. 25, 1980

[54] DISPENSING APPARATUS FOR USE WITH A TRACTOR

[76] Inventors: Robert F. Cohen, 14 Susan Pl., Edison, N.J. 08817; Leonard Cohen, 1594 Putney Rd., Valley Stream, N.Y. 11580

[21] Appl. No.: 86,942

[22] Filed: Oct. 22, 1979

[51] Int. Cl.³ .......................... B05B 9/06; A01C 7/08
[52] U.S. Cl. .................................... 239/155; 111/11; 239/685
[58] Field of Search ............... 239/155, 156, 685, 677, 239/665, 656; 222/610, 609, 613, 614, 136; 414/441; 172/548, 555, 540, 438, 537; 111/10, 11, 12, 13

[56] References Cited

U.S. PATENT DOCUMENTS

| | | | |
|---|---|---|---|
| 42,758 | 5/1864 | Eley | 239/685 X |
| 2,829,896 | 4/1958 | Swenson | 222/610 |
| 2,841,401 | 7/1958 | Mascaro | 239/683 |
| 2,946,597 | 7/1960 | Simonsen | 239/656 |
| 3,085,807 | 4/1963 | Tyler | 239/665 |
| 3,685,468 | 8/1972 | Paige | 111/11 |

Primary Examiner—Robert B. Reeves
Assistant Examiner—Gene A. Church
Attorney, Agent, or Firm—Arthur L. Plevy

[57] ABSTRACT

There is disclosed a dispensing apparatus which is mounted at the rear of a tractor and which employs two friction wheels mounted on a common frame. The frame is pivotally mounted so that an operator can cause the friction wheels to engage the rear wheels of the tractor. The friction wheels are attached to a rotatable shaft which contains a pulley. When the friction wheels engage the tractor wheels, the pulley rotates and by means of an associated belt, causes rotation of a dispensing cylinder associated with a cannister or hopper containing chemicals to be dispensed. Means are provided for adjusting the tension on the belt as well as for engaging said friction wheels in constant contact with the tractor wheels. The apparatus further incorporates a selectively actuated aerator assembly which is used in conjunction with the dispensing apparatus to maintain and perform lawn maintenance services.

9 Claims, 3 Drawing Figures

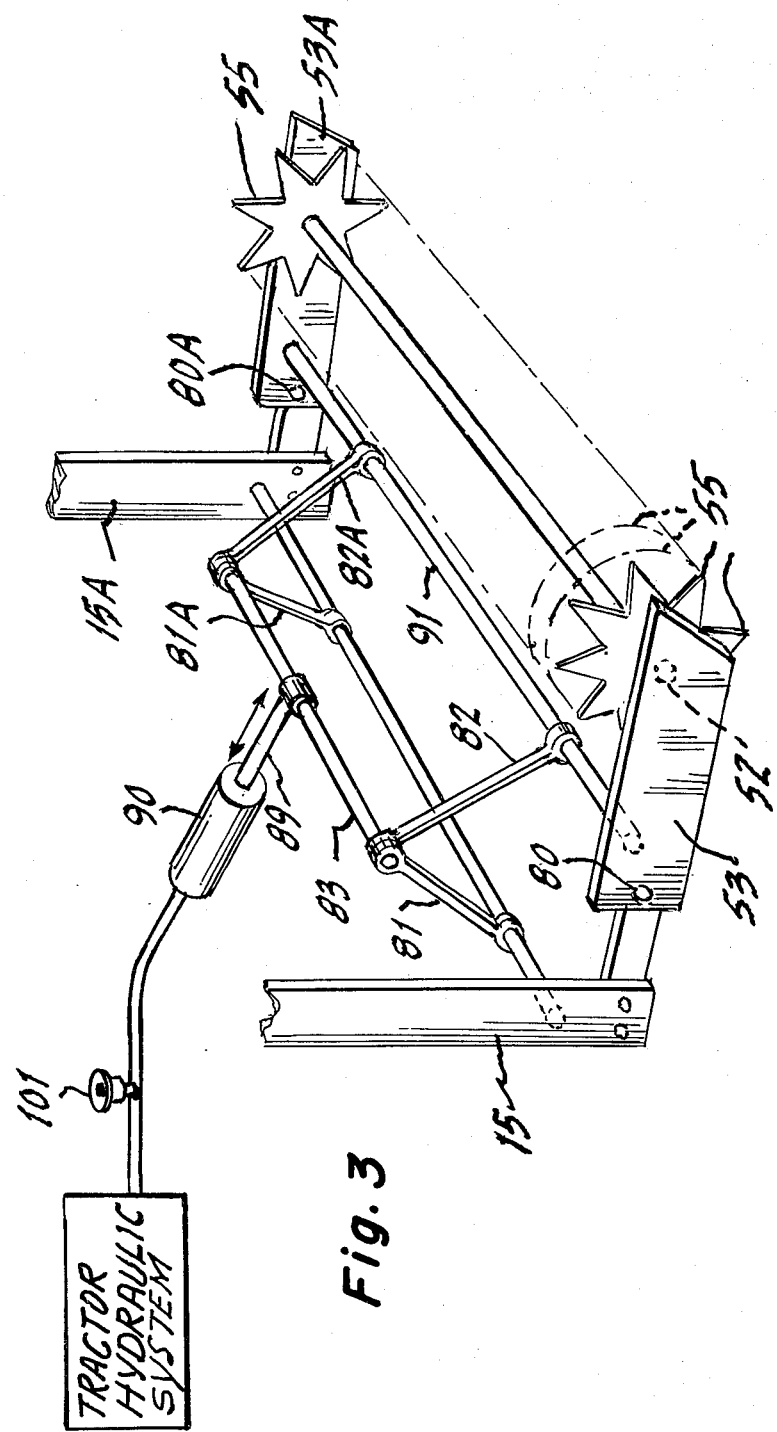

DISPENSING APPARATUS FOR USE WITH A TRACTOR

BACKGROUND OF THE INVENTION

This invention relates to a dispensing apparatus such as a spreader and more particularly to a chemical dispensing apparatus for use with a tractor.

As one can ascertain, there are many mechanisms which are presently employed to dispense various chemicals which are used in the treatment of lawns and so on. Presently, there are many private and franchise operations which offer the consumer lawn care or lawn maintenance services. As such, these operations will apply fertilizer, seed, insecticides and various other chemicals needed to adequately maintain a lawn. As such, it is extremely desirable to employ some form of automatic equipment so that such materials can be rapidly and effectively applied. In doing so, both the consumer and the operator save time and expense.

The prior art is replete with a number of patents which show various types of spreading devices which are automatically operated from a tractor or other types of machinery. For example, U.S. Pat. No. 42,758 entitled FERTILIZER issued on May 17, 1864 to P. Eley shows a cart which may contain manure or some other substance and as the cart is manually moved, a cylinder is rotated. Power for rotating the cylinder is afforded by the wheel of the cart.

Other patents such as U.S. Pat. No. 2,841,401 entitled SPREADER FOR FERTILIZER AND THE LIKE issued on July 1, 1958 to A. Mascara shows a push spreader for distributing lawn materials. This spreader employs a pulley system which engages a tire portion of a wheel and rotates the spreader element. There are other patents such as U.S. Pat. Nos. 2,829,896; 2,946,597 and 3,085,807 which employ drive mechanisms operative to operate a spreader mechanism from the wheel of an external vehicle.

In any event, there are various problems in regard to such patents and such systems. Certain of the problems reside in the fact that the systems are complicated and require extensive renovation of the vehicle to which they are attached to in order to fully and optimumly operate the same. A further problem is that the majority of these systems employ a single drive wheel which is coupled to one wheel of the vehicle. Such mechanisms produce unbalanced forces and are mechanically unstable as well as being difficult to maintain and repair.

It is an object of the present invention to provide an improved dispensing apparatus for use with a tractor or similar vehicle. The apparatus employs dual friction wheels which are mounted on a common shaft and adapted to engage both rear wheels of a tractor or vehicle. The system to be described is extremely economical and efficient and is adapted for use with a large number of commercially available tractor mechanisms and can be secured to such mechanisms rapidly and efficiently.

BRIEF DESCRIPTION OF THE PREFERRED EMBODIMENT

In combination with a tractor of the type employing two rear wheels, with an operator's seat located adjacent said wheels and relatively central thereto, said tractor employing an attachment frame assembly extending from the rear and beyond said wheels for attaching various implements thereto, a dispensing apparatus comprising a pivotable frame member pivotally secured to said attachment frame and comprising a first and a second parallel, longitudinal member extending towards said seat, with said first member pivotally mounted on said attachment frame and extending above and adjacent to one rear wheel, with said second frame member pivotally mounted on said attachment frame and extending above and adjacent said other rear wheel, a rotatable shaft positioned between said first and second longitudinal members and relatively transverse thereto, a first friction wheel secured to said shaft near said first member, a second friction wheel secured to said shaft near said second member, said first and second wheels adapted to coact with said associated rear wheels when said frame member is pivoted in an operating mode, a cannister housing secured to said attachment frame assembly and having located therein a rotatable material dispensing cylinder, said cylinder coupled to a drive pulley for rotating the same, a pulley coupled to said rotatable shaft and positioned between said first and second friction wheels, an endless belt located about said drive pulley and said rotatable shaft pulley and operative to rotate said dispensing cylinder when said shaft pulley is rotated, a pivotable lever coupled to one of said first and second longitudinal members and operative to pivot said frame member to cause said friction wheels to engage said rear wheels of said tractor, when said lever is pushed downwardly, said lever capable of being pivoted in said downward position to extend underneath said operator's seat to thereby maintain engagement of said friction wheels with said rear wheels of said tractor.

BRIEF DESCRIPTION OF THE FIGURES

FIG. 3 is a partial perspective view of an aerator mechanism used in conjunction with the invention.

DETAILED DESCRIPTION OF THE INVENTION

Figure 1:
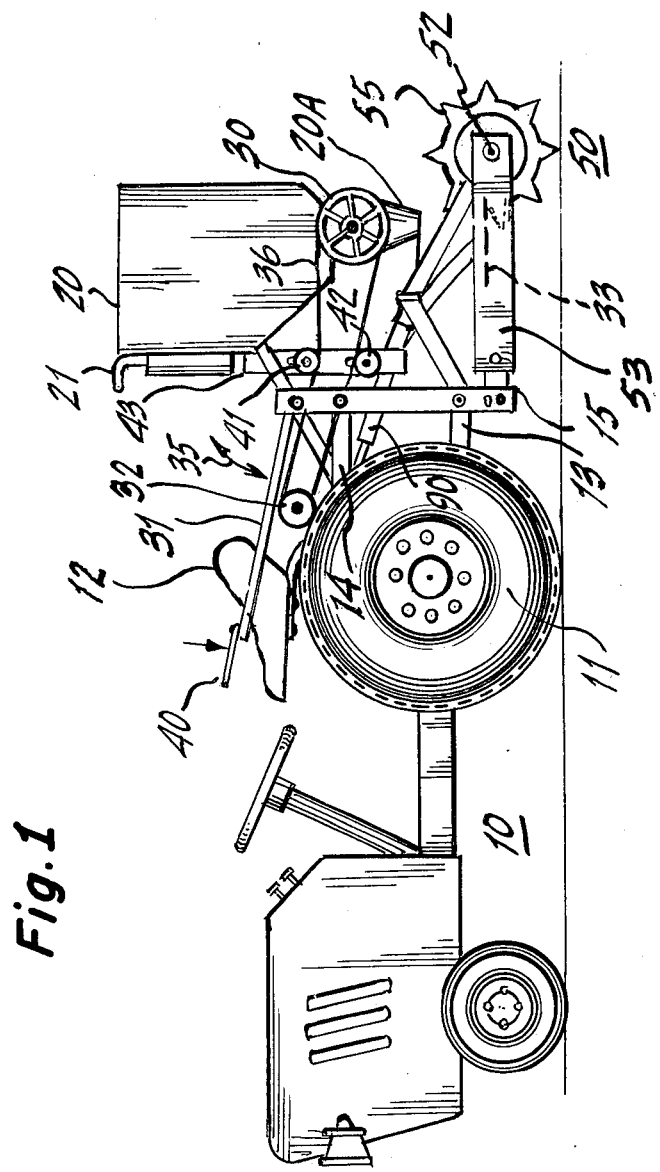
FIG. 1 is a side plan view of a tractor coupled to a dispensing apparatus according to this invention.

Referring to FIG. 1, there is generally shown an outline of a tractor 10. As such, there are many examples of tractors such as 10 which will operate according to the principles of this invention to be described. It is noted at the onset that any type of vehicle can be employed, but a tractor vehicle is preferable due to the fact that the user can employ the tractor in various other applications when the tractor is not being used to accommodate the dispensing apparatus according to this invention. As such, a suitable tractor is manufactured by a company called Engineering Research Associates of Wisconsin and sold under the trade name Jim Dandy as the economy model. This tractor is relatively small and is capable of providing 14hp in operation.

As shown in FIG. 1, the tractor 10 has a relatively large rear wheel 11. FIG. 1 shows one wheel but it is common knowledge that such tractors employ two rear wheels. Disposed between the rear wheels is a seat 12 which the operator is positioned on to control the path of the tractor.

Essentially as shown in FIG. 1, such tractors have a frame attachment mechanism which may consist of a series of bars or steel beams such as 12 and 13. These beams extend from the rear of the tractor beyond the wheel 11 and are used for attaching various equipment thereto.

As one can ascertain, the nature of the frame members such as 12 and 13 are not pertinent and the apparatus to be described is adapted to be attached to any type of tractor or vehicle as 10 in a simple and reliable manner.

Shown coupled to the attachment frame assembly is a vertical beam 15. There is a similar beam located on the other side as will be shown in FIG. 2. In essence, the beam 15 serves as the main base for the entire dispenser frame assembly as will be explained and hence, it can be ascertained that it is relatively simple to couple such a beam configuration to any frame attachment assembly associated with a conventional tractor as 10.

Rigidly secured to the tractor assembly is a cannister or hopper mechanism 20. Cannisters such as 20 are well known in the art and basically accommodate a material to be dispensed such as a fertilizer, seed and so on. Cannisters such as 20 may contain one or more compartments for holding different materials to be dispensed. As such, the cannisters contain a series of operating valves as 21 which operate to select one compartment as compared to another or to select more than one compartment to thereby enable an operator to distribute, for example, seed and fertilizer in a single operation.

Located internal to the cannister 20 is a rotatable dispensing mechanism or cylinder. As the cylinder rotates, it causes the material to be dispensed to be uniformly distributed via the output section of the cannister 20A sometimes referred to as the flute. Shown in FIG. 1 is a pulley 30. The pulley is attached to the dispensing cylinder associated with cannister 20 and hence, as the pulley 30 rotates, it causes the dispensing cylinder to rotate as well.

Material which is discharged from the flute 20A is dropped on a spinner plate 33 (shown in dashed line). The spinner plate is electrically operated and is rotated by means of a motor. As the material is discharged onto the spinner plate, the rotation of the plate causes the material to circulate within a confined area and hence, assures that the material that is being dispensed is uniformly distributed. As such, the cannister 20 and the spinner plate 33 are known in the art and are conventional components.

In any event, it is one object of the present invention to enable the rotation of pulley 30 and hence, to control the rotation of the dispensing cylinder associated with the cannister according to the speed of the vehicle. It is, of course, an object of any efficient dispensing apparatus to control the rotation of the dispensing cylinder according to the speed of the vehicle to thereby assure that the optimum amount of material is being distributed.

Shown in FIG. 1 is a pivotable longitudinal member or bar 31. The bar 31 is pivotably coupled to the beam 15 and can move in the direction of the arrow 35. It is noted that there is a corresponding bar as 31 associated with the other side of the tractor. Bar 31 and its associated bar form a pivotable frame member. The frame member thus formed has a rotatable shaft located relatively transverse to the bar 31. The shaft contains a friction wheel 32. There is another friction wheel which is associated with the other tire of the tractor as will be shown.

Located on the rotatable shaft is a pulley. The pulley is not shown in FIG. 1 but serves to drive the pulley 30 by means of a suitable belt 36 directed about pulley 30.

Also shown in FIG. 1 is a pivotable lever 40, which lever is mounted on the frame assembly and in this instance, is mounted on member 31.

Tension in the belt 36 is adjusted by means of two idler pulleys 41 and 42. The idler pulleys are located on an idler plate 43 which is rigidly secured to the cannister 20 or to the dispenser frame assembly. The top idler 41 is adjustable within a slot in the plate 43 and exerts a downward force on the belt 36. The bottom idler 42 is also adjustable and exerts an upward force on the belt 36. These forces can be adjusted to achieve an optimum tension in the belt when being driven.

As seen from FIG. 1, an operator by exerting a downward force on lever 40 will cause the friction wheels such as 32 to engage the rear wheel such as 11 of the tractor. The friction wheel 32 has its periphery covered with an elastomeric material such as a plastic or rubber to create friction and therefore to enable efficient driving of the same by the tractor wheel. Hence, as can be ascertained from FIG. 1, as the lever 40 is pushed downward, the wheel 32 engages the tractor wheel 11. This causes the shaft upon which wheel 32 is mounted to rotate and hence, pulley 30 is rotated as will be further explained. Since the lever 40 is pivotable, the operator can pivot the lever towards the seat 12 and secure the lever underneath the seat to maintain the friction wheel 32 in contact with the tire 11 and hence, the operator can dispense materials while using both hands for guiding the tractor.

In combination with the dispensing mechanisms described above, there is shown an aerator assembly 50. Essentially, aeration of the lawn may be afforded at the same time certain materials are dispensed. The aerator assembly consists of a rotatable shaft 52 upon which is mounted a plurality of circular blade members 53 which are used to penetrate the soil. The shaft 50 is positioned between two pivotable plates such as 53. A bar mechanism, as will be explained, is coupled to the aerator assembly. The mechanism is operated by means of a hydraulic cylinder 90. The cylinder 90 may be coupled to the hydraulic power output associated with the tractor 10 and upon actuation of the cylinder 90, the aerator mechanism 50 is moved into contact with the ground and hence, the operator can perform dispensing and aeration simultaneously or separately, if desired.

Figure 2:
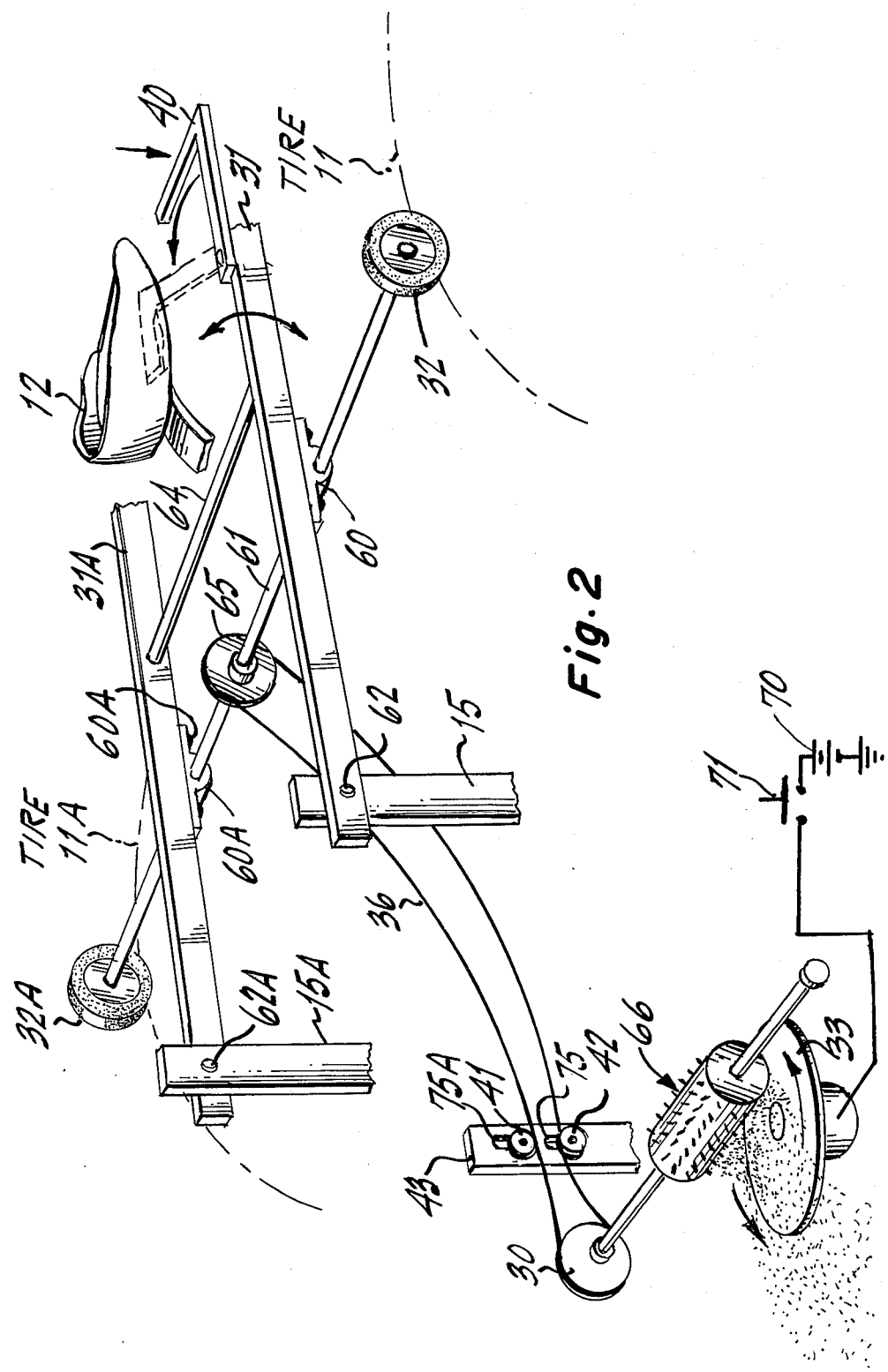
FIG. 2 is a partial perspective view of the drive mechanisms used the dispensing apparatus.

Referring to FIG. 2, there is shown a perspective view of the dispensing mechanism and dispensing frame assembly together with the pulley system for both the rear wheels 11 and 11A of the tractor. As shown in FIG. 1, the member 31 is a longitudinal bar which extends from an area proximate to the seat to the frame beam 15. The beam 15 may be secured to the tractor attachment frame by such conventional means as bolts and so on. There is one frame bar 15 for the right side of the tractor and a similar bar 15A shown on the left side of the tractor. Using this nomenclature, it is seen from FIG. 2 that the left side of the tractor also has a longitudinal member 31A which corresponds to member 31 and is relatively parallel thereto.

Located and secured to members 31 and 31A is an associated pillar block 60 and 60A. These blocks may contain bearings. Located within the apertures in blocks 60 and 60A is a rotatable shaft 61, which shaft is relatively transverse to members 31 and 31A. Secured to the extreme right side of the shaft 61 is the friction wheel 32. Secured to the other side of the shaft 61 is a similar friction wheel 32A which is adapted to coact with rear wheel 11A.

The longitudinal bars 31 and 31A are pivotally coupled to frame members 15 and 15A via couplings 62 and 62A. Pivotable couplings such as 62 and 62A are well known in the art and many examples of coupling the frame assembly to members as 15 and 15A should be clearly understood by those skilled in the art. Also shown in FIG. 2 is a reinforcing bar 64 which extends between members 31 and 31A to afford greater support to the assembly.

Shown coupled on shaft 61 and located between the longitudinal members 31 and 31A is a pulley 65. The belt 36 encircles this pulley and is also directed about pulley 30, which pulley is coupled to the dispensing cylinder 66 located within the hollow of the cannister 20 and shown in FIG. 2. Located beneath the dispensing cylinder 66 is the spinning plate 33. The plate 33 is rotatably mounted and driven by means of a motor.

Shown schematically in FIG. 2 is a wire connecting the motor of the plate 33 to the tractor battery 70. The switch 71 selectively applies power to the spinning plate means or motor and is preferably located near the driver position on the tractor 10.

As can be clearly seen from FIG. 2, as a downward force is exerted on lever 40, the friction wheels 32 and 32A contact the surfaces of the rear wheels 11 and 11A of the tractor. This causes both friction wheels to rotate and hence, imparts rotational motion to the shaft 61 and therefore to the pulley 65. This rotational motion is imparted to pulley 30 via the belt 36 and hence, the dispenser cylinder 66 is driven.

Also shown in FIG. 2 are the idler wheels 41 and 42 located on the idler plate 43. The idler wheels are adjustable within slots 75 and 75A and hence, tension on the belt 36 both in an upward and downward direction can be properly set and maintained by means of the wheels 41 and 42.

As can be seen from FIG. 2, the operator of the vehicle, by imposing a force on the lever 40, can cause wheels 32 and 32A to engage the tractor wheels and hence, operate the dispensing cylinder 66 as the tractor is being moved. As indicated, the lever 40 is pivotable. The operator can pivot the lever to the dashed line position where it is positioned beneath the seat 12 of the tractor and hence, in this position, the dispensing cylinder 66 is continually rotated and the operator may then drive the tractor or operate the tractor using both hands. As can be ascertained, the operator can simply disengage or engage the dispensing mechanisms by controlling of the lever 40 as indicated and hence, he may operate the dispensing mechanism continuously or intermittently as desired.

Referring to FIG. 3, there is shown a simple mechanical diagram of the aerator mechanisms. As indicated, the aerator assembly consists of a plurality of circular blades 53 located on a rotatable shaft 52. The shaft 52 is rotatably mounted between plates 53 and 53A. Plates 53 and 53A are pivotally connected to the frame member 15 by means of pivot points as 80 and 80A. A hinge mechanism is afforded by members such as 81 and 82 which are hinged between a bar 83. The bars 82 and 82A may be connected directly to a rod or shaft 91 located between plates 53 and 53A.

Cylinder 90 is shown and is rigidly mounted on the frame assembly. The cylinder has a movable piston assembly 89 which is coupled to member 81A or bar 83. The cylinder, as indicated, is coupled to the tractor hydraulic system or power take off 100. When the valve 101 is operated, the piston 89 pushes the bar 83 towards the ground causing the aerator blades to contact the ground surface and hence, as indicated, the operator by the manual operation of the valve 101, can perform dispensing and aeration as desired.

The entire aerator assembly as shown in FIG. 1 is completely compatible with the dispensing mechanism and is fabricated as part of the assembly. This gives the user of this dispensing apparatus great versatility in performing all functions necessary to maintain and care for lawns and other property.

As can be seen, the entire unit is referenced to the two supporting beams such as 15 and 15A, which beams can be easily accommodated and mounted on any type of tractor assembly to fully afford the above described operation. It is, of course, understood that many additional support beams as well as coupling techniques can be employed in conjunction with the support beams such as 15 and 15A in order to give greater rigidity and add mechanical strength to the entire assembly. Thus, the cannister 50 may be supported by additional rods or members which emanate from various other beams which can be positioned transverse to the beams 15 and 15A.

It is thus seen that there is described a very efficient and simple mechanism for the automatic dispensing of chemicals or other materials with a conventional tractor 10. The unit affords positive drive by means of two friction wheels, each of which engage respective rear wheels of the tractor. This provides for efficient and reliable operation of the unit, while providing great mechanical stability.

It is believed that one skilled in the art upon reading the above specification will be aware of many alternatives and modifications which may be employed without departing from the spirit and scope of the claims appended hereto.

We claim:

1. In combination with a tractor of the type employing two rear wheels, with an operator's seat located adjacent said wheels and relatively central thereto, said tractor employing an attachment frame assembly extending from the rear and beyond said wheels for attaching various implements thereto, a dispensing apparatus comprising:
    (a) a pivotable frame member pivotally secured to said attachment frame and comprising a first and a second parallel, longitudinal member extending towards said seat, with said first member pivotally mounted on said attachment frame and extending above and adjacent to one rear wheel, with said second frame member pivotally mounted on said attachment frame and extending above and adjacent said other rear wheel,
    (b) a rotatable shaft positioned between said first and second longitudinal members and relatively transverse thereto, a first friction wheel secured to said shaft near said first member, a second friction wheel secured to said shaft near said second member, said first and second wheels adapted to coact with said associated rear wheels when said frame member is pivoted in an operating mode,
    (c) a cannister housing secured to said attachment frame assembly and having located therein a rotatable material dispensing cylinder, said cylinder coupled to a drive pulley for rotating the same, (d) a pulley coupled to said rotatable shaft and positioned between said first and second friction wheels, (e) an endless belt located about said drive pulley and said rotatable shaft pulley and operative to rotate said dispensing cylinder when said shaft pulley is rotated, (f) a pivotable lever coupled to one of said first and second longitudinal members and operative to pivot said frame member to cause said friction wheels to engage said rear wheels of said tractor, when said lever is pushed downwardly, said lever capable of being pivoted in said downward position to extend underneath said operator's seat to thereby maintain engagement of said friction wheels with said rear wheels of said tractor.

2. The combination according to claim 1, further comprising:
(a) an idler wheel plate mounted on said attachment frame, a first idler wheel coupled to said plate positioned above said endless belt and adapted to exert a downward pressure on said belt, a second idler wheel coupled to said idler plate positioned below said endless belt and adapted to exert an upward pressure on said belt.

3. The combination according to claim 1, further comprising:
(a) an aerator blade assembly pivotally mounted to said attachment frame and located beneath said cannister, and adapted when pivoted to contact the surface upon which said tractor is operating, (b) a cylinder coupled to said blade assembly and operative when actuated to pivot said aerator to contact said surface.

4. The combination according to claim 1 wherein said rotatable shaft is coupled to said first and second longitudinal members by means of a first pillar block located on said first member and a second pillar block located on said second member.

5. The combination according to claim 1 further comprising an electrically operated rotatable spinner plate means positioned below said cannister and operative to receive material dispensed by said cannister for distributing the same.

6. The combination according to claim 2 wherein said idler wheels are adjustably coupled to said plate to adjust the pressure exerted by said wheels on said endless belt.

7. The combination according to claim 3 wherein said cylinder is hydraulically operated and means coupled to said cylinder for operating the same from a hydraulic source.

8. The combination according to claim 5 further comprising means coupling said spinner plate means to a source of operating potential, and switching means located on said tractor for selectively applying said source to said plate means.

9. The combination according to claim 1 wherein said first and second friction wheels have an elastomeric material located about the periphery to enable an effective drive of the same when engaging said rear tractor wheels.

* * * * *